(12) United States Patent
Kong et al.

(10) Patent No.: US 10,565,674 B2
(45) Date of Patent: Feb. 18, 2020

(54) GRAPHICS PROCESSING DEVICE AND GRAPHICS PROCESSING METHOD

(71) Applicant: Shanghai Zhaoxin Semiconductor Co., Ltd., Shanghai (CN)

(72) Inventors: Weiman Kong, Beijing (CN); Yuanyuan Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 11 days.

(21) Appl. No.: 15/953,794

(22) Filed: Apr. 16, 2018

(65) Prior Publication Data

US 2019/0206019 A1 Jul. 4, 2019

(30) Foreign Application Priority Data

Jan. 4, 2018 (CN) .......................... 2018 1 0008431

(51) Int. Cl.
*G06T 1/60* (2006.01)
*G06T 1/20* (2006.01)

(52) U.S. Cl.
CPC . *G06T 1/20* (2013.01); *G06T 1/60* (2013.01)

(58) Field of Classification Search
CPC .... G06T 9/00; G09G 5/393; G09G 2360/127; G09G 5/39; G09G 5/395; G06F 9/30032; G06F 8/447; G06F 7/57; H04N 19/119; H04N 19/176; H04N 19/196

See application file for complete search history.

(56) References Cited

U.S. PATENT DOCUMENTS

| | | | |
|---|---|---|---|
| 2005/0052463 A1 | 3/2005 | Hung | |
| 2014/0341287 A1* | 11/2014 | Mody | H04N 19/176 375/240.13 |
| 2016/0042550 A1* | 2/2016 | Li | G06T 15/005 345/426 |
| 2017/0249717 A1 | 8/2017 | Meixner et al. | |

OTHER PUBLICATIONS

Office Action dated Dec. 20, 2018, issued in U.S. Appl. No. 15/814,709.

* cited by examiner

*Primary Examiner* — Hau H Nguyen
(74) *Attorney, Agent, or Firm* — McClure, Qualey & Rodack, LLP

(57) ABSTRACT

A technique for graphics processing which processes an image in units of blocks is disclosed. A graphics processing device has a buffer, an indicator register and an arithmetic logic unit (ALU). The buffer is provided to buffer a plurality of source blocks. The indicator register includes at least one instruction pointer. The ALU uses the instruction pointer to read source pixels in a first source block of the plurality of source blocks and adjacent source pixels in at least an adjacent source block with respect to the first source block from the buffer, to generate a first target block.

24 Claims, 6 Drawing Sheets

GRAPHICS PROCESSING DEVICE AND GRAPHICS PROCESSING METHOD

CROSS REFERENCE TO RELATED APPLICATIONS

This application claims priority of China Patent Application No. 201810008431.0, filed on Jan. 4, 2018, the entirety of which is incorporated by reference herein.

BACKGROUND OF THE INVENTION

Field of the Invention

The present application relates to graphics processing techniques.

Description of the Related Art

A graphics processing unit (GPU) is a device that is typically used in image processing on personal computers, workstations, game consoles, and some mobile devices (such as tablet PCs and smartphones), which frequently capture and process image content. Capturing image content with less system overhead is a vitally important issue in the graphics processing field.

BRIEF SUMMARY OF THE INVENTION

In this invention, graphics processing is performed in units of "blocks". Each block includes a plurality of pixels. The retrieved pixel data is repeatedly used in calculations. The burden of repeatedly reading pixel data from system memory, therefore, is reduced.

A graphics processing device in accordance with an exemplary embodiment of the disclosure includes a buffer, at least an indicator register and an arithmetic logic unit (ALU). The buffer is provided to buffer a plurality of source blocks. The indicator register includes at least an instruction pointer. The ALU uses the instruction pointer to read source pixels in a first source block of the plurality of source blocks and adjacent source pixels in at least an adjacent source block with respect to the first source block from the buffer, to generate a first target block.

A graphics processing method in accordance with an exemplary embodiment of the disclosure includes the following steps: providing a buffer within a graphics processing device to buffer a plurality of source blocks; providing at least an indicator register within the graphics processing device to provide at least one instruction pointer; and using the instruction pointer to read source pixels in a first source block of the plurality of source blocks and adjacent source pixels in at least an adjacent with respect to the first source block from the buffer, to generate a first target block.

In this invention, graphics processing is performed in units of "blocks", for improving the utilization of the captured image data and efficiency of image processing, avoiding repeatedly loading image data from the system memory to the buffer of image processing device, and reducing the frequency of capturing image data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
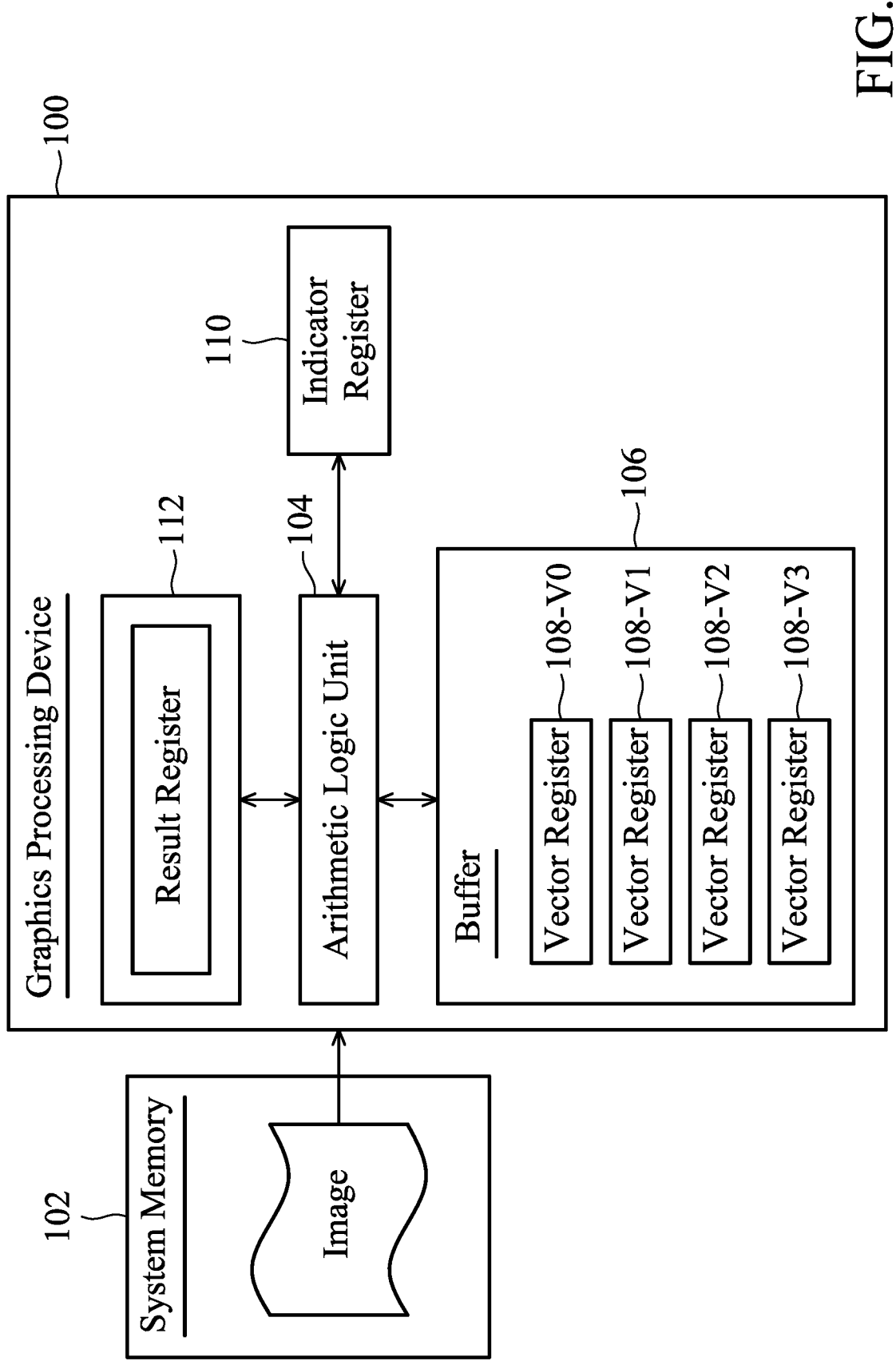
FIG. 1 illustrates a graphics processing device 100 in accordance with an exemplary embodiment of the disclosure.

FIG. 1 illustrates a graphics processing device 100 for performing graphics processing on an image in accordance with an exemplary embodiment of the disclosure. The image may be a picture or one frame of a video. The data of the image may be stored in system memory 102. The graphics processing device 100 may capture pixel data of an image from the system memory 102 in units of "blocks" (each block is an n×m pixel array including n rows of pixels within m columns, n and m are integers greater than 1) rather than retrieving one single pixel each time. One block of pixel data captured from the system memory 102 is buffered by a vector register (e.g., one of the vector registers 108-V0 . . . 108-V3) of the buffer 106. Pixel data is read from the buffer 106 to be processed for generation of target data in units of blocks (each block is an n×m pixel array including n rows of pixels within m columns, n and m are integers greater than 1). A processed image, therefore, is generated. This disclosure aims to perform graphics processing in units of "blocks". The retrieved pixel data is utilized more efficiently and high-efficiency graphics processing is achieved. It prevents a buffer to load the same pixel data repeatedly from system memory within the graphics processing device. The graphics processing device 100 of the disclosure may be a graphics processing unit (GPU), a vision processing unit (VPU), a digital signal processor (DSP), or the like.

By the graphics processing technique, source pixels are processed to generate target pixels. For example, by using a p×q filter/kernel, each window of pixels (each window including p rows of source pixels within q columns) is filtered to get a target pixel corresponding to the window center, wherein the height p of the filter and the width q of the filter are integers greater than 1. More specifically, by graphics processing, source blocks (each is an n×m pixel array) are evaluated to generate target blocks (each is an n×m pixel array). Based on graphics processing in units of blocks, the generation of target pixels in the same target block may require overlapped source pixels. Even, the required source pixels for generation of target pixels of different target blocks may also overlap. When each time one single pixel is retrieved for graphics processing, the same pixel data has to be repeatedly loaded from the system memory. Instead, the technique of performing graphics processing in units of blocks in the disclosure reduces the number of times that the graphics processing device 100 captures source pixel data from the system memory 102. The captured source pixel data is repeatedly utilized and the efficiency of graphics processing is improved.

The graphics processing device 100 includes an arithmetic logic unit (ALU) 104 and a plurality of registers. The illustrated register includes a buffer 106 that includes a plurality of vector registers 108-V0 . . . 108-V3, an indicator register 110, and a result register 112 for temporary storage of generated target blocks. In the process of generating a target block by performing graphics processing on source blocks, the arithmetic logic unit 104 does not only capture source pixels from only one particular source block, but also capture adjacent source pixels from source blocks adjacent to the particular source block. The arithmetic logic unit 104 buffers the particular source block entirely in the buffer 106 (buffered in one of the vector registers 108-V0 . . . 108-V3). In addition to the particular source block, other source blocks are also buffered in the vector registers 108-V0 . . . 108-V3. When performing graphics processing (e.g. 3×3 window filtering), there is no need to redundantly repeat the loading of the same source pixels from the system memory 102. In addition to a particular source block, adjacent source pixels within other source blocks adjacent to the particular source block are also available in the buffer 106 and there is no need to redundantly repeat the loading of the same source pixels from the system memory 102. The arithmetic logic unit 104 may read source pixel data from a plurality of positions in the buffer 106 by using the instruction pointer in the indicator register 110. According to the source pixel data read from the buffer 106, the arithmetic logic unit 104 may generate target pixel data to complete the graphics processing for generation of a target block. The arithmetic logic unit 104 may store the graphics processing result (e.g. the generated target block) in the result register 112 for temporary storage, which may be used to get the complete graphics processing result of the entire image. In some exemplary embodiments, multiple registers are used to implement the function of the indicator register 110. One or more instruction pointers are stored in each indicator register for reading source pixels from buffered source blocks. In some exemplary embodiments, the target block temporarily stored in the result register 112 is further written to the system memory 102.

As shown, the buffer 106 may include a plurality of vector registers 108-V0 . . . 108-V3. Each vector register may store one or more source blocks. When the arithmetic logic unit 104 finishes using a source block in a vector register in a stage of graphics processing, the vector register may be updated by new source pixel data. In exemplary embodiment of one vector register buffering one source block, all source pixels buffered in a vector register (e.g. 108-V0) may be released from the vector register 108-V0, and then another block of pixel data is loaded from the system memory 102 to the vector register 108-V0. The source pixels of the source blocks still required in another stage of graphics processing may be kept buffered in the corresponding vector registers (without updating the corresponding vector registers).

Figure 2:
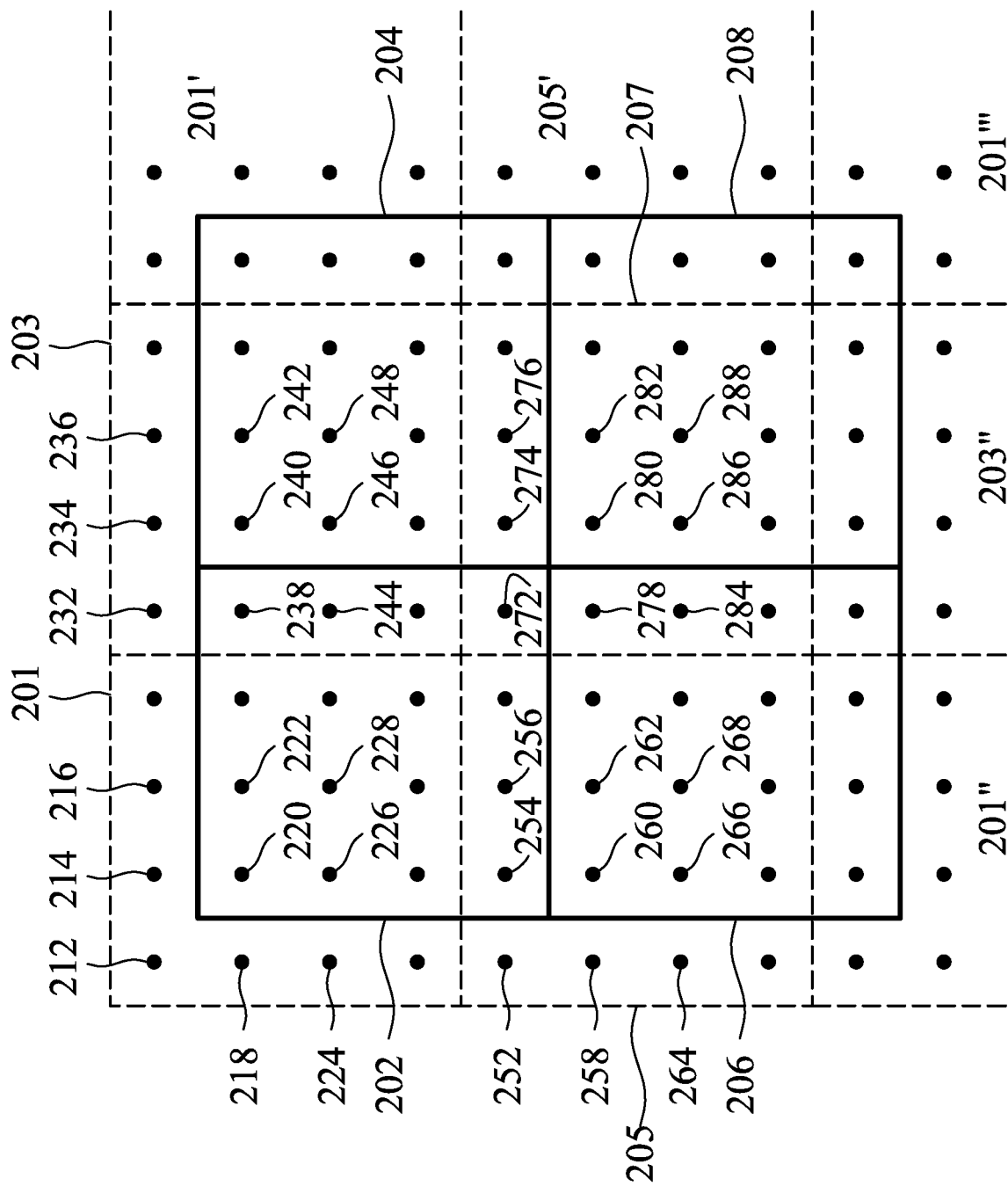
FIG. 2 illustrates a graphics processing concept in accordance with an exemplary embodiment of the disclosure, wherein each defined block contains 4×4 pixels.

FIG. 2 illustrates a graphics processing concept in accordance with an exemplary embodiment of the disclosure. Each block contains 4×4 pixels. As shown, source blocks 201, 203, 205 and 207 each contain 4×4 pixels, and target blocks 202, 204, 206 and 208 generated after graphics processing each contain 4×4 pixels. The 4×4 block size is just an exemplary and it is not intended to limit the block size to 4×4 pixels. In this example, a 3×3 filter is used in the graphics processing. The 3×3 filter size is also just an exemplary and it is not intended to limit the filter size to 3×3.

The graphics processing for generation of the target block 202 is discussed in this paragraph. A source pixel group, containing 8×8 pixels, is read from the system memory 102 and buffered in the buffer 106. The source pixel group is divided into four source blocks 201, 203, 205 and 207 (each containing 4×4 pixels), each of them is buffered in one of the four vector registers 108-V0, 108-V1, 108-V2 and 108-V3, respectively. In this example, the source block 201 is regarded as a first source block and the target block 202 is regarded as a first target block. The source blocks 203, 205 and 207 adjacent to the first source block 201 are regarded as adjacent source blocks with respect to the first source block 201. To generate the target block 202, the arithmetic logic unit 104 performs window filtering on source pixels that contain the first source block 201 and adjacent pixels adjacent to the first source block 201 and retrieved from the adjacent source blocks 203, 205 and 207. A 3×3 filter is used for the window filtering. The arithmetic logic unit 104 performs 3×3 window filtering 16 times to generate the first target block 202. The first 3×3 filtering operation in the 16 times of filtering operations is discussed by way of example. The top-left-corner target pixel (this target pixel locates on where the source pixel 220 locates) in the first target block 202 is generated by the first 3×3 window filtering. The top-left-corner source pixel (pixel 212) in the first source block 201 is regarded as the top-left-corner window pixel for the first 3×3 window filtering. As shown, source pixels 212, 214, 216, 218, 220, 222, 224, 226 and 228 are input to the 3×3 filter for generation of the target pixel 220. Every target pixel is generated by using a 3×3 filter to filter nine source pixels. To generate the target block 202, in addition to all source pixels in the first source block 201, adjacent source pixels contained in other source blocks adjacent to the first source block 201 are also required. The first source block 201 is buffered in the vector register 108-V0. The adjacent source pixels can be read from the adjacent source blocks 203, 205 and 207, which is respectively buffered in the vector registers 108-V1, 108-V2 and 108-V3. All the required source pixels in the generation of the target block 202 can be obtained from the buffered source blocks 201, 203, 205 and 207. The arithmetic logic unit 104 may set an instruction pointer in the indicator register 110 to read the buffer 106 to get all source pixel data required for the generation of the target block 202. The instruction pointer may point to the source pixel 212 firstly (setting the top-left-corner pixel within a first 4×4 source pixel array to be the source pixel 212) to get the first 4×4 source pixel array, i.e. the source block 201. Then, the instruction pointer moves to point to the source pixel 214 (setting the top-left-corner pixel within a second 4×4 source pixel array to be the source pixel 214) to get the second 4×4 source pixel array. Then, the instruction pointer moves point to the source pixel 216 (setting the top-left-corner pixel within a third 4×4 source pixel array to be the source pixel 216) to get the third 4×4 source pixel array. Then, the instruction pointer moves point to the source pixel 218 (setting the top-left-corner pixel within a fourth 4×4 source pixel array to be the source pixel 218) to get the fourth 4×4 source pixel array. The instruction pointer is changed repeatedly till the instruction pointer has been moved nine times to point to the source pixel 228 (setting the top-left-corner pixel within a ninth 4×4 source pixel array to be the source pixel 228) to get the ninth 4×4 source pixel array. In this manner, all source pixels for the generation of the target block 202 are successfully read. The arithmetic logic unit 104 changes the instruction pointer nine times to get nine arrays of 4×4 source pixels, which are required for the generation of the target block 202. The required source pixels include the whole source block 201 buffered in the vector register 108-V0 and adjacent source pixels within the other source blocks 203, 205 and 207 adjacent to the source block 201. In the disclosure, the adjacent source pixels are read from the vector registers 108-V1, 108-V2 and 108-V3 having the source blocks 203, 205 and 207 pre-buffered therein. With all the required source pixels ready, the arithmetic logic unit 104 performs 3×3 window filtering on the required source pixels and thereby generates the target block 202 and stores the target block 202 to another register, e.g. the result register 112 shown in FIG. 1. In this disclosure, each of the vector registers 108-V1, 108-V2 and 108-V3 buffers a source block (e.g. 203, 205 and 207). Only a portion of the buffered source blocks 203, 205 and 207 is used in the generation of the target block 202. In another exemplary embodiment, each of the vector registers 108-V1, 108-V2 and 108-V3 just stores a portion of a source block (e.g. a portion of source block 203, 205 or 207). Only the adjacent source pixels required in the generation of the target block 202 are buffered. Furthermore, in another exemplary embodiment, the design of the indicator register 110 may be changed to read the buffer 106 in another way, and it is not intended that the arithmetic logic unit 104 be limited to read the buffer 106 nine times to get the required source pixels for the generation of the target block 202.

In the disclosure, the graphics processing for generation of the target pixels within the same target block may share the source pixels buffered in the buffer 106. Compared to the conventional techniques performing graphics processing in unit of pixel, the disclosed graphics processing device 100 performing graphics processing in unit of block can read many pixels (i.e., a block of pixels) at a time, avoiding accessing to the system memory 102 frequently. Moreover, in this manner, the graphics processing device 100 can perform multiple 3×3 window filtering processes in parallel, and perform graphics processing in unit of block to generate a whole target block (including a plurality of target pixels) each time, improving the efficiency of graphics processing.

In one embodiment, the source pixel data required in the generation of the target block 202 may be read by three instruction pointers. The instructions performed by the arithmetic logic unit 104 include:

rep3 mac P0, W0, acc0, step
rep3 mac P1, W1, acc0, step
rep3 mac P2, W2, acc0, step Each of the three instruction pointers P0, P1 and P2 is configured for reading 4×4 pixels data. For each instruction, "resp3" stands for executing instruction pointer three times to read 4×4 pixels data each time, "step" stands for a step change of the instruction pointer, "mac" stands for performing a multiply-add calculation. The instruction pointer P0 is changed three times to read three 4×4 source pixel arrays by indicating the top-left-corner pixels 212, 214 and 216 within the three 4×4 source pixel arrays. The instruction pointer P1 is moved three times to read three 4×4 source pixel arrays by indicating the top-left-corner pixels 218, 220 and 222 within the three 4×4 source pixel arrays. The instruction pointer P2 is moved three times to read three 4×4 source pixel arrays by indicating the top-left-corner pixels 224, 226 and 228 within the three 4×4 source pixel arrays. According to the aforementioned three instructions, a calculation, acc0=P0×W0+acc0, is repeated three times, a calculation, acc0=P1×W1+acc0, is repeated three times, and a calculation, acc0=P2×W2+acc0, is repeated three times. W0, W1 and W2 are weights of the filter, which can be designed to perform filtering to source pixels by a 3×3 slide window, for example, each of the weights may be set to ⅑ to perform mean filtering. In other exemplary embodiments, the multiply-add calculation, "mac", may be replaced by the other linear calculations such as the calculation required for Gaussian filtering. In an exemplary embodiment, an instruction pointer is moved along the columns and then switched to the next row. In another exemplary embodiment, an instruction pointer is moved along the rows and then switched to the next column.

Hardware such as a multiplexer and a shifter may be used to achieve the function of the instruction pointers (e.g. the aforementioned instruction pointers P0, P1 and P3). For example, the multiplexer is used to output the indicated source pixels buffered in the vector registers 108-V0, 108-V1, 108-V2 and 108-V3 and the shifter is used to sort the source pixels outputting from the multiplexer in a proper order.

The vector registers 108-V0 and 108-V2 may be updated after the generation of the target block 202. The source blocks 201 and 205 are cleared from the vector registers 108-V0 and 108-V2. The system memory 102 reads the source blocks 201' and 205' (shown in FIG. 2) to update the vector registers 108-V0 and 108-V2, respectively. However the source blocks 203 and 207 still kept in the vector registers 108-V1 and 108-V3. The arithmetic logic unit 104 starts the generation of the next target block 204. In this embodiment, the source block 203 is named as the second source block and the target block 204 is named as the second target block. Similar to the generation of the first target block 202, the arithmetic logic unit 104 uses the instruction pointer(s) in the indicator register 110 to get all source pixels required in the generation of the target block 204. The instruction pointer may point to the source pixel 232 firstly (setting the top-left-corner pixel within a first 4×4 source pixel array to be the source pixel 232) to get the first 4×4 source pixel array, i.e. the source block 203. Then, the instruction pointer moves to point to the source pixel 234 (setting the top-left-corner pixel within a second 4×4 source pixel array to be the source pixel 234) to get the second 4×4 source pixel array. Then, the instruction pointer moves to point to the source pixel 236 (setting the top-left-corner pixel within a third 4×4 source pixel array to be the source pixel 236) to get the third 4×4 source pixel array from the buffer 106. Then, the instruction pointer moves to point to the source pixel 238 (setting the top-left-corner pixel within a fourth 4×4 source pixel array to be the source pixel 238) to get the fourth 4×4 source pixel array. The instruction pointer moves repeatedly till the instruction pointer has moved nine times to point to the source pixel 248 (setting the top-left-corner pixel within a ninth 4×4 source pixel array to be the source pixel 248) to get the ninth 4×4 source pixel array. In this manner, all source pixels required for the generation of the target block 204 are successfully read. The arithmetic logic unit 104 uses 3×3 window filtering to process the retrieved source pixels and thereby the second target block 204 is generated. The ninth 4×4 source pixel array is read from the vector registers 108-V0, 108-V1, 108-V2 and 108-V3 with each vector register provided 2×2 source pixels. It should be noted that the vector registers 108-V0 and 108-V2 have been updated to buffer the source blocks 201' and 205', respectively. In another exemplary embodiment, the vector registers 108-V0 and 108-V2 are not updated to contain the source blocks 201' and 205', but only contain a portion of pixels in the source block 201' and the source block 205', which are required for the generation of the target block 204. In another exemplary embodiment, the buffer 106 may include another vector register 108-V4. The ninth 4×4 source pixel array is read from the vector registers 108-V0, 108-V1, 108-V3 and 108-V4 with each vector register provided 2×2 source pixels. The vector register 108-V0 has been updated by the pixels in the source block 201'. The whole source block 205' is buffered by the vector register 108-V4. In another exemplary embodiment, only a portion of pixels in the source block 205' required for the generation of the target block 204 are buffered by the vector register 108-V4.

In another exemplary embodiment, the target block 206 adjacent to the lower side of the first target block 202 is selected as the second target block, and the source block 205 adjacent to the lower side of the first source block 201 should be regarded as the corresponding second source block. The vector registers 108-V0 and 108-V1 may be updated after the generation of the target block 202. The source blocks 201 and 203 are cleared from the vector registers 108-V0 and 108-V1. The system memory 102 is read again to update source blocks 201" and 203" to the vector registers 108-V0 and 108-V1, respectively. The source blocks 201" and 203" are indicated in FIG. 2. The source block 205 is regarded as the second source block and the target block 206 is regarded as the second target block. Similar to the generation of the first target block 202, the arithmetic logic unit 104 sets the instruction pointer(s) in the indicator register 110 to get all source pixels required in the generation of the target block 206. The instruction pointer may point to the source pixel 252 firstly (setting the top-left-corner pixel within a first 4×4 source pixel array to be the source pixel 252) to get the first 4×4 source pixel array, i.e. the source block 205. Then, the instruction pointer moves to point to the source pixel 254 (setting the top-left-corner pixel within a second 4×4 source pixel array to be the source pixel 254) to get the second 4×4 source pixel array. Then, the instruction pointer moves to point to the source pixel 256 (setting the top-left-corner pixel within a third 4×4 source pixel array to be the source pixel 256) to get the third 4×4 source pixel array from the buffer 106. Then, the instruction pointer moves to point to the source pixel 258 (setting the top-left-corner pixel within a fourth 4×4 source pixel array to be the source pixel 258) to get the fourth 4×4 source pixel array from the buffer 106. The instruction pointer has moved repeatedly till the instruction pointer has moved nine times to point to the source pixel 268 (setting the top-left-corner pixel within a ninth 4×4 source pixel array to be the source pixel 268) to get the ninth 4×4 source pixel array. In this manner, all source pixels for the generation of the target block 206 are successfully read. In an exemplary embodiment, the ninth 4×4 source pixel array may be composed by four sets of 2×2 source pixels read from the vector registers 108-V0, 108-V1, 108-V2 and 108-V3 respectively. It should be noted that the vector registers 108-V0 and 108-V1 have been updated to buffer the source blocks 201" and 203", respectively. In another exemplary embodiment, the ninth 4×4 source pixel array is retrieved from the vector registers 108-V0, 108-V2, 108-V3 and 108-V4 with each vector register provided 2×2 source pixels. It should be noted a portion of pixels in the source block 201" and the source block 203" (shown in FIG. 2) are used for updating the vector registers 108-V0 and 108-V1 respectively. In an exemplary embodiment, the buffer 106 may comprise a vector register 108-V4. The ninth 4×4 source pixel array may be composed by four sets of 2×2 source pixels read from the vector registers 108-V0, 108-V1, 108-V3 and 108-V4 respectively, wherein the vector register 108-V0 has been updated by the source block 201"(shown in FIG. 2), and the vector register 108-V4 buffers the whole source block 203" (shown in FIG. 2). In another exemplary embodiment, only a portion of pixels in the source block 203" required for the generation of the target block 206 are buffered by the vector register 108-V4.

After the generation of the target blocks 202, 204 and 206, the vector registers 108-V0, 108-V1 and 108-V2 may be updated respectively by source blocks 201'", 203" and 205' (shown in FIG. 2) read from the system memory 102. The source pixels in the vector register 108-V3 are kept. The arithmetic logic unit 104 proceeds to generate the target block 208. The arithmetic logic unit 104 sets the instruction pointer(s) in the indicator register 110 to read the buffer 106 to get all source pixels required for the generation of the target block 208. The instruction pointer may point to the source pixel 272 firstly (setting the top-left-corner pixel within a first 4×4 source pixel array to be the source pixel 272) to get the first 4×4 source pixel array, i.e. the source block 207. Then, the instruction pointer moves to point to the source pixel 274 (setting the top-left-corner pixel within a second 4×4 source pixel array to be the source pixel 274) to get the second 4×4 source pixel array. Then, the instruction pointer moves to point to the source pixel 276 (setting the top-left-corner pixel within a third 4×4 source pixel array to be the source pixel 276) to get the third 4×4 source pixel array. Then, the instruction pointer moves to point to the source pixel 278 (setting the top-left-corner pixel within a fourth 4×4 source pixel array to be the source pixel 278) to get the fourth 4×4 source pixel array. The instruction pointer moves repeatedly till the instruction pointer has moved nine times to point to the source pixel 288 (setting the top-left-corner pixel within a ninth 4×4 source pixel array to be the source pixel 288) to get the ninth 4×4 source pixel array. The ninth 4×4 source pixel array may be composed by four sets of 2×2 source pixels read from the vector registers 108-V0, 108-V1, 108-V2 and 108-V3 respectively, wherein the vector register 108-V3 does not update and keeps the source block 207, the vector registers 108-V0, 108-V1 and 108-V2 update to buffer the source blocks 201'", 203" and 205'. All required source pixels for the generation of the target block 208 are buffered in the vector registers 108-V0, 108-V1, 108-V2 and 108-V3. The arithmetic logic unit 104 performs 3×3 window filtering to the required source pixels for generating the target block 208.

The first source block is not limited to the source block 201 shown in FIG. 2. For example, the source block 203 of FIG. 2 may be used as the first source block. When all vector registers have been updated, a target pixel group has been generated. The group size is not limited to 8×8 pixels and the size of each block is not limited to 4×4 pixels. In another exemplary embodiment, one group corresponding to one round of updating of all vector registers may be set in a size of 64×64 pixels, and each block contains 8×8 pixels. The shape of the group and block may be not limited to square as shown in FIG. 2. In an exemplary embodiment, the shape of the group and block may be rectangle, for example, the group corresponding to one round of updating of all vector registers may be set in a size of 4×64 pixels, and each block contains 2×32 pixels. The size of the buffer 106 may be set to be able to buffer one group of pixels. The size of each vector register 108 may be set to be able to buffer one block of pixels. The size of each vector register may be set depending on the bandwidth of the system memory 102. The larger the size of the block, the more unnecessary to repeatedly load pixel data from the system memory to the buffer of the GPU. The efficiency of graphics processing is significantly improved.

Figure 3:
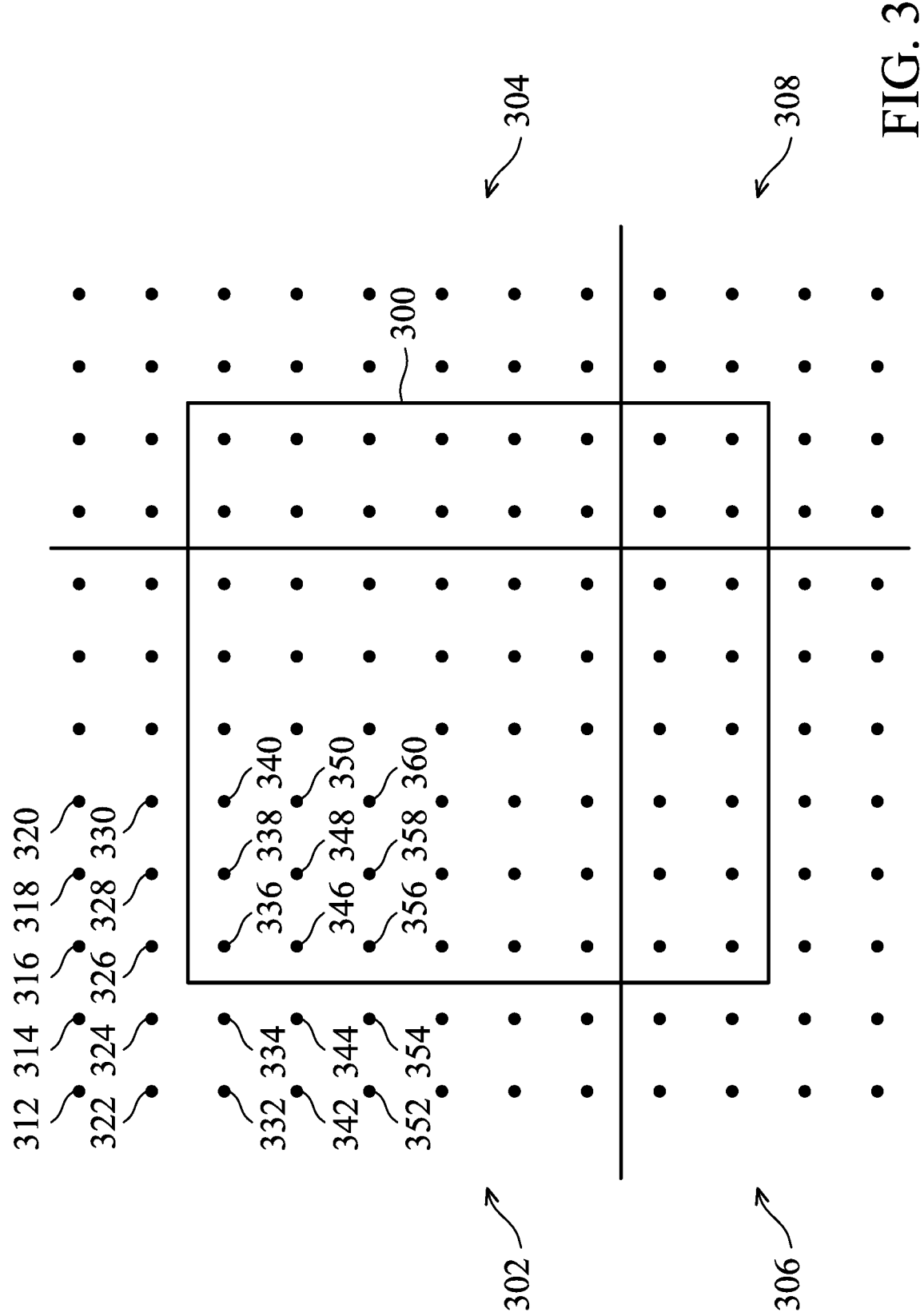
FIG. 3 depicts another graphics processing concept in accordance with another exemplary embodiment of the disclosure, wherein each block contains 8×8 pixels.

The size of the filter window is not limited to 3×3. In an exemplary embodiment, window filtering in size of 5×5 may be performed. In an exemplary embodiment, the arithmetic logic unit 104 sets a step range of the instruction pointer based on a height or width of the filter window. By properly setting the step range of the instruction pointer, the instruction pointer(s) may be moved to read all source pixels required for generation of target pixels from the buffer 106. FIG. 3 depicts another graphics processing concept in accordance with another exemplary embodiment of the disclosure. Each block contains 8×8 pixels. Graphics processing is performed by 5×5 window filtering.

Referring to FIG. 3, a target block 300 is expected to be generated. Four source blocks 302, 304, 306 and 308, each of which contains 8×8 pixels, are buffered in vector registers 108-V0, 108-V1, 108-V2 and 108-V3, respectively. To generate the target block 300, the arithmetic logic unit 104 needs the whole source pixels in the source block 302 as well as adjacent source pixels in other source blocks 304, 306 and 308 adjacent to the source block 302. A portion of pixels in the source blocks 304, 306 and 308 buffered in the vector registers 108-V1, 108-V2 and 108-V3 are regarded as the adjacent source pixels. The arithmetic logic unit 104 may operate an instruction pointer in the indicator register 110 to get all source pixels from the vector registers 108-V0, 108-V1, 108-V2 and 108-V3 required for the generation of target block 300. The instruction pointer may point to the source pixel 312 firstly (setting the top-left-corner pixel within a first 8×8 source pixel array to be the source pixel 312) to get the first 8×8 source pixel array, i.e. the source block 302. Then, the instruction pointer moves to point to the source pixel 314 (setting the top-left-corner pixel within a second 8×8 source pixel array to be the source pixel 314) to get the second 8×8 source pixel array. Then, the instruction pointer moves to point to the source pixel 316 (setting the top-left-corner pixel within a third 8×8 source pixel array to be the source pixel 316) to get the third 8×8 source pixel array from the buffer 106. The instruction pointer has moved repeatedly till the instruction pointer has moved five times to point to the source pixel 320 (setting the top-left-corner pixel within a fifth 8×8 source pixel array to be the source pixel 320) to get the fifth 8×8 source pixel array from the buffer 106. Then, the instruction pointer moves to point to the source pixel 322 in the next row (setting the top-left-corner pixel within a sixth 8×8 source pixel array to be the source pixel 322) to get the sixth 8×8 source pixel array from the buffer 106. The instruction pointer has moved repeatedly till the instruction pointer has moved to point to the source pixel 330 (setting the top-left-corner pixel within a tenth 8×8 source pixel array to be the source pixel 330) to get the tenth 8×8 source pixel array from the buffer 106. The instruction pointer has moved repeatedly for getting many 8×8 pixel arrays in the following rows and columns till the instruction pointer has moved twenty-five times to point to the source pixel 360 (setting the top-left-corner pixel within a twenty-fifth 8×8 source pixel array to be the source pixel 360) to get the twenty-fifth 8×8 pixel array. In this manner, all source pixels required for generation of the target block 300 are successfully read. By moving the instruction pointer 25 times, the arithmetic logic unit 104 can get twenty-five 8×8 source pixel arrays. All the source pixels of the source block 302 (buffered in the vector register 108-V0) and adjacent source pixels of the source blocks 304, 306 and 308 adjacent to the source block 302 (buffered in the vector registers 18-V1, 108-V2 and 108-V3 respectively) are read and performed 5×5 window filtering by the arithmetic logic unit 104. The target block 300 shown in FIG. 3 is generated and stored to another vector register, such as the result register 112 of FIG. 1. In another exemplary embodiment, the indicator register 110 may comprise five instruction pointers. Each of the instruction pointers moves five times to read all required source pixels for generation of the target block 300.

Figure 4:
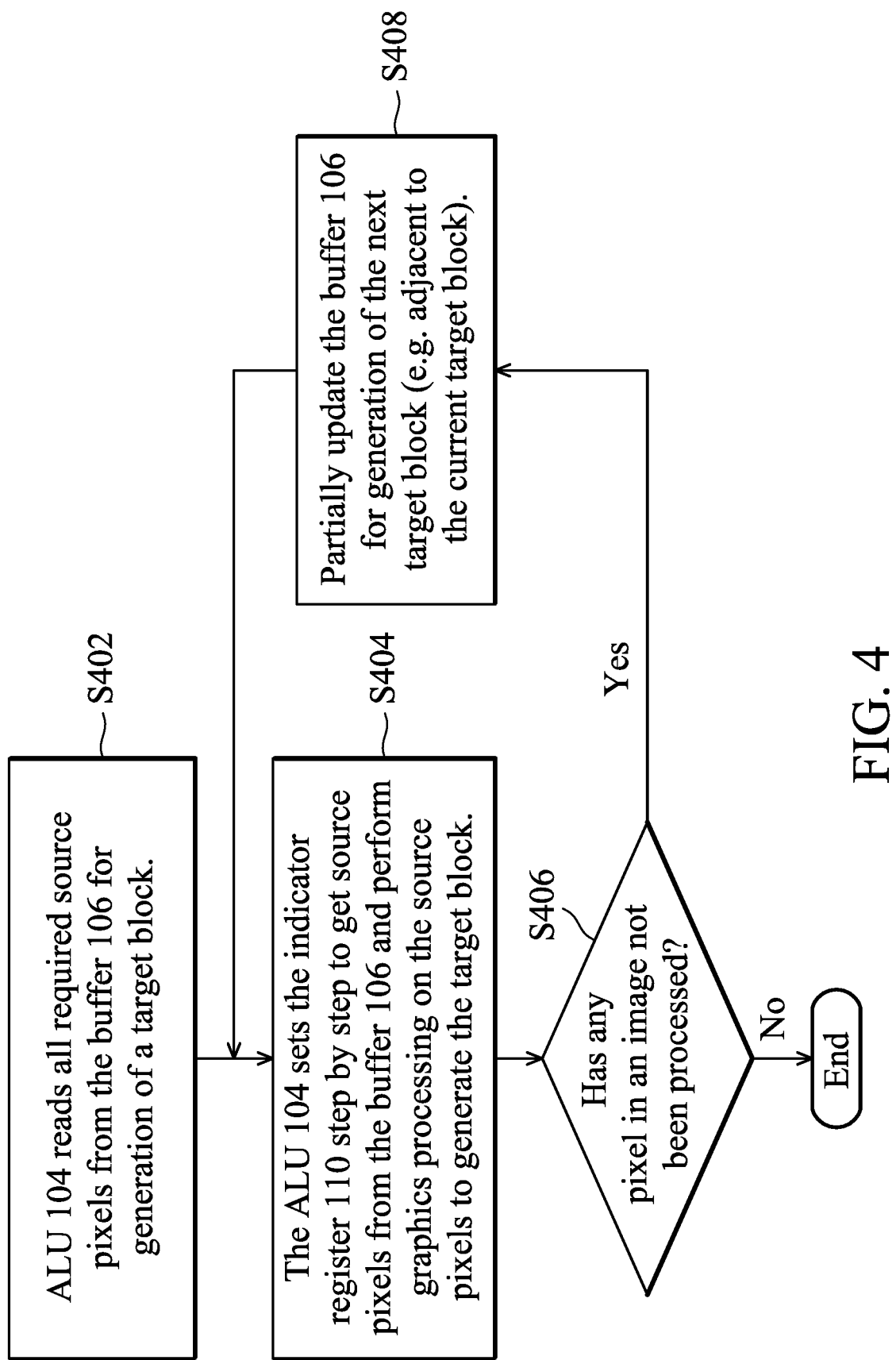
FIG. 4 is a flowchart depicting the graphics processing to be performed by the graphics processing device 100 of FIG. 1 in accordance with an exemplary embodiment of the disclosure.

FIG. 4 is a flowchart depicting the graphics processing to be performed by the graphics processing device 100 of FIG. 1 in accordance with an exemplary embodiment of the disclosure. In step S402, the arithmetic logic unit 104 reads all required source pixels from the buffer 106 for generation of a target block. In step S404, the arithmetic logic unit 104 sets the indicator register 110 step by step to get source pixels from the buffer 106 and perform graphics processing on the source pixels to generate the target block. In step S406, it is checked whether any pixel in an image has not been processed. If yes, step S408 is performed for generation of the next target block (e.g. adjacent to the current target block) and the buffer 106 is updated partially for the graphics processing for generation of the next target block. In step S408, only some of the vector registers in the buffer 106 may be updated, therefore, the amount of data read from the system memory 102 to arithmetic logic unit 104 may be significantly decreased. When it is determined in step S406 that the graphics processing performed to the image t has been finished, the flow of FIG. 4 ends. Noting that marginal pixels of the image may be mirrored to meet the block size, therefore, management of the vector register in the buffer 106 and the generation of the target block can be performed in unit of block.

Figure 5A:
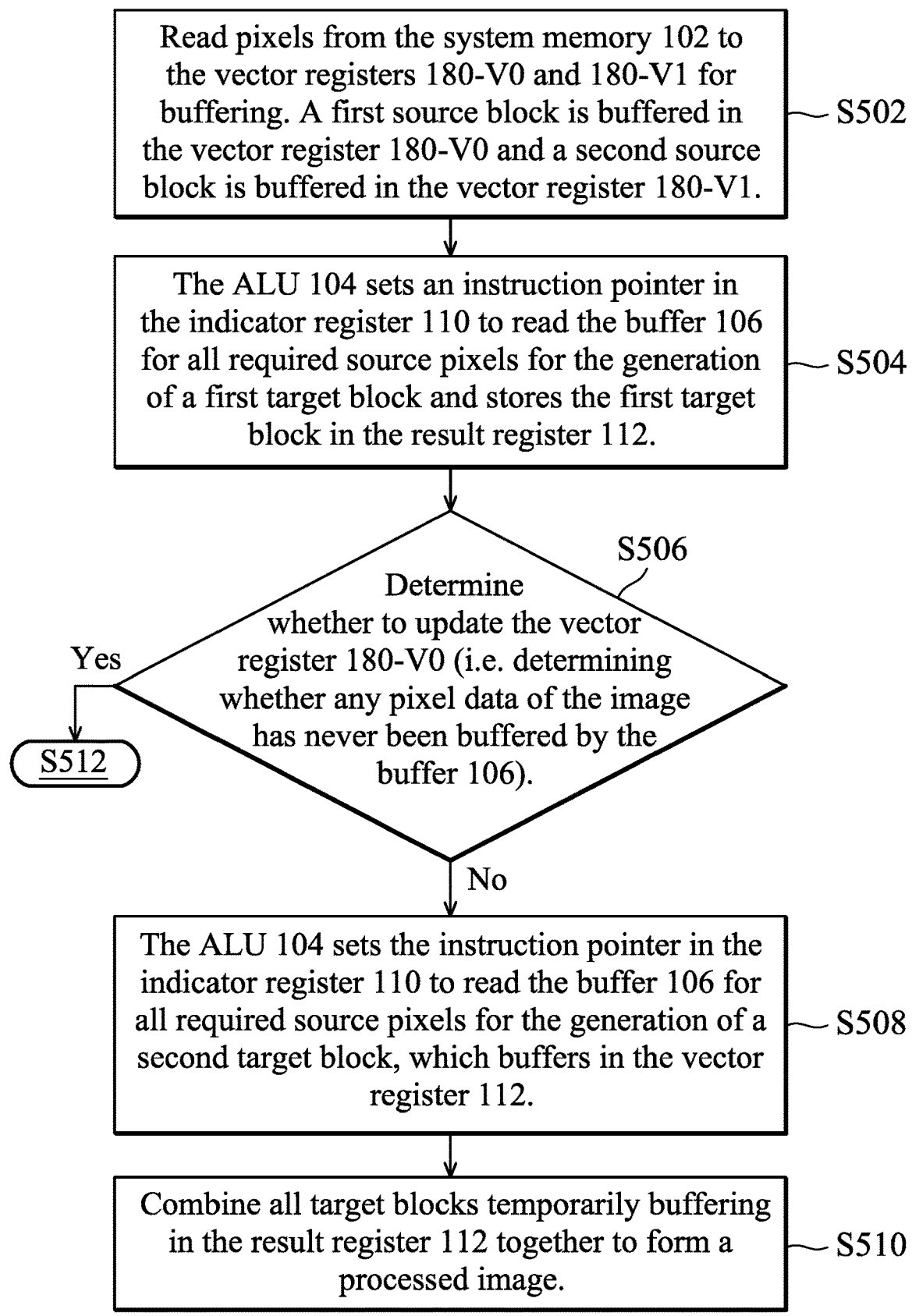
FIG. 5A and FIG. 5B depict a flowchart using only two vector registers in the buffer 106 of FIG. 1 for graphics processing of an image retrieved from the system memory 102 in accordance with an exemplary embodiment of the disclosure.
Figure 5B:
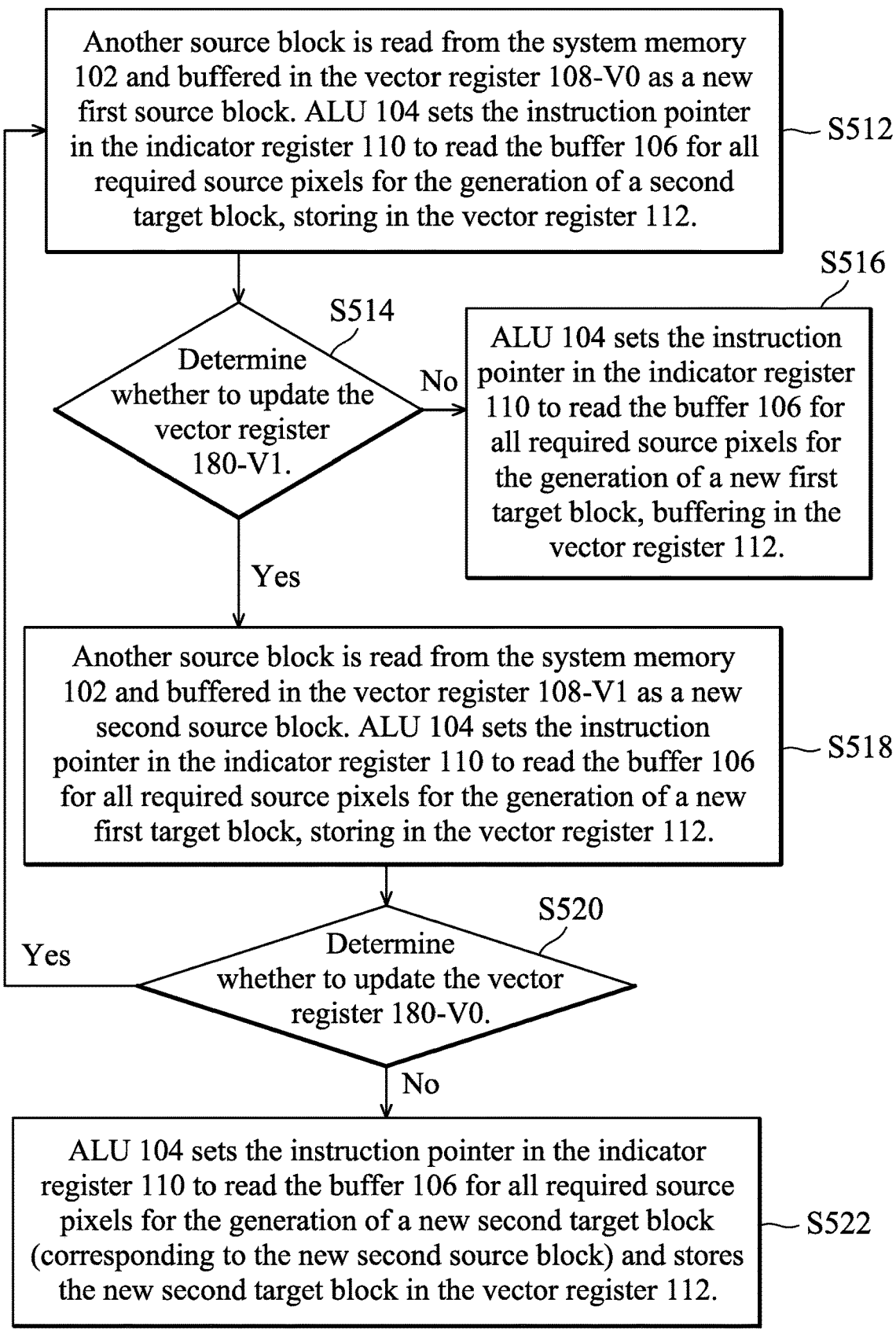

FIG. 5A and FIG. 5B depict a flowchart using only two vector registers in the buffer 106 of FIG. 1 for graphics processing of an image retrieved from the system memory 102 in accordance with an exemplary embodiment of the disclosure. In step S502, pixels are read from the system memory 102 to the vector registers 108-V0 and 108-V1 for buffering. A first source block is buffered in the vector register 180-V0 and a second source block is buffered in the vector register 108-V1. In step S504, the arithmetic logic unit 104 sets an instruction pointer in the indicator register 110 to read the buffer 106 for all required source pixels for the generation of a first target block and stores the first target block in the result register 112. The all required source pixels for generation of the first target block include all the pixels within the first source block and adjacent source pixels within another source block(s) adjacent to the first source block. In step S506, it is determined whether to update the vector register 180-V0 (i.e. determining whether any pixel data of the image has never been buffered by the buffer 106). If no, step S508 is performed, in step S508, the arithmetic logic unit 104 sets the instruction pointer in the indicator register 110 to read the buffer 106 for all required source pixels for the generation of a second target block, which buffers in the result register 112. The all required source pixels for the generation of the second target block include all the pixels within the second source block and adjacent source pixels within another source block(s) adjacent to the second source block. In step S510, all target blocks temporarily buffering in the result register 112 are combined together to form a processed image. When it is determined in step S506 that there is still pixel data never been buffered by the buffer 106, step S512 is performed. In step S512, another source block is read from the system memory 102 and buffered in the vector register 108-V0 as a new first source block. The arithmetic logic unit 104 sets the instruction pointer in the indicator register 110 to read the buffer 106 for all required source pixels for the generation of a second target block, storing in the result register 112. The all required source pixels for the generation of the second target block include all the pixels within the second source block and adjacent source pixels within another source block adjacent to the second source block. In step S514, it is determined whether to update the vector register 108-V1 (i.e. determining whether any pixel data of the image has never been buffered by the buffer 106). If no, step S516 is performed. In step S516, the arithmetic logic unit 104 sets the instruction pointer in the indicator register 110 to read the buffer 106 for all required source pixels for the generation of a new first target block, buffering in the result register 112. The all required source pixels for the generation of the new first target block include all the source pixels in the new first source block (updated in step S512) and adjacent source pixels in another source block adjacent to the new first source block. Step S510 may be performed to combine all target blocks temporarily buffering in the result register 112 together to form a processed image. When it is determined in step S514 that there is still pixel data never been buffered by the buffer 106, step S518 is performed. In step S518, another source block is read from the system memory 102 and buffered in the vector register 108-V1 as a new second source block. The arithmetic logic unit 104 sets the instruction pointer in the indicator register 110 to read the buffer 106 for all required source pixels for the generation of a new first target block, storing in the result register 112. The all required source pixels for the generation of the first target block include all the pixels in the new first source block (updated in step S512) and adjacent source pixels in another source block adjacent to the new first source block. In step S520, it is determined whether to update the vector register 108-V0 (i.e. determining whether any pixel data of the image has never been buffered by the buffer 106). If no, step S522 is performed. In step S522, the arithmetic logic unit 104 sets the instruction pointer in the indicator register 110 to read the buffer 106 for all required source pixels for the generation of a new second target block (corresponding to the new second source block) and stores the new second target block in the result register 112. Step S510 may be performed to combine all target blocks temporarily stored in the result register 112 together to form a processed image. When it is determined in step S520 that there is still pixel data never been buffered by the buffer 106, step S512 is performed. In step S512, another source block is read from the system memory 102 and buffered in the vector register 108-V0 as a new first source block, and the arithmetic logic unit 104 sets the instruction pointer in the indicator register 110 to read the buffer 106 for all required source pixels for the generation of a second target block, storing in the result register 112. The all required source pixels for the generation of the second target block include all the pixels within the new second source block (updated in step S518) and adjacent source pixels in another source block adjacent to the new second source block. Steps S514 to S520 are repeated for the graphics processing until pixel data buffered in the vector registers 108-V0 and 108 V1 is been processed.

Other techniques that use the above concepts in graphics processing are within the scope of the disclosure. Based on the above contents, the present invention further relates to a method for graphics processing.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics processing device, comprising:
   a buffer, buffering a plurality of source blocks, wherein the plurality of source blocks are directly read from a system memory;
   an indicator register, including at least one instruction pointer; and
   an arithmetic logic unit, using the instruction pointer to read all source pixels in a first source block of the plurality of source blocks and adjacent source pixels in at least an adjacent source block with respect to the first source block from the buffer, to generate a first target block that includes a plurality of target pixels.

2. The graphics processing device as claimed in claim 1, wherein:
   the buffer buffers a source pixel group of an image read from the system memory, wherein the source pixel group includes the plurality of source blocks, and the buffer includes a plurality of vector registers, and each of the plurality of source blocks is buffered in corresponding one of the plurality of vector registers.

3. The graphics processing device as claimed in claim 1, wherein:
   the first target block and each of the plurality of source blocks contain n×m pixels including n rows of pixels in m columns, wherein n and m are integers greater than 1.

4. The graphics processing device as claimed in claim 1, wherein:
   to generate the first target block, the arithmetic logic unit performs a linear calculation on all required source pixels, read from the buffer by using the instruction pointer, wherein all required source pixels include all source pixels in the first source block and the adjacent source pixels.

5. The graphics processing device as claimed in claim 4, wherein:
   the linear calculation performed by the arithmetic logic unit is filtering by using a p×q window filter, wherein an input of the p×q window filter includes a p×q pixel array including p rows of source pixels within q columns, an output of the p×q window filter includes a target pixel corresponding to the first target block, wherein p and q are integers greater than 1.

6. The graphics processing device as claimed in claim 5, wherein:
   the arithmetic logic unit sets a step range of the instruction pointer based on a height p or a width q of the p×q window filter.

7. The graphics processing device as claimed in claim 5, wherein:
   the filtering is mean filtering, wherein mean filtering is performed by setting same weights to each of source pixels in p×q pixel array to get the target pixel.

8. The graphics processing device as claimed in claim 5, wherein:
   the filtering performed by the arithmetic logic unit includes generation of a top-left-corner target pixel of the first target block based on an n×m pixel array including n rows of source pixels within m columns, wherein the top-left-corner target pixel of the first target block is regarded as a top-left-corner pixel in the n×m pixel array.

9. The graphics processing device as claimed in claim 1, wherein:
after generating the first target block, the arithmetic logic unit uses the instruction pointer to read source pixels in a second source block and adjacent source pixels in at least an adjacent source block with respect to the second source block from the buffer, for generating a second target block, wherein pixels of the first source block in a vector register have been updated by pixels of a new source block read from the system memory.

10. The graphics processing device as claimed in claim 1, wherein:
a plurality of pixels in the buffer have been updated by a plurality of pixels in a new source block read from the system memory after the first target block is generated.

11. The graphics processing device as claimed in claim 1, wherein:
the arithmetic logic unit gets a plurality of source pixel arrays by moving a top-left-corner array pixel along all source pixels of a top-left-corner target pixel of the first target block; and
when the arithmetic logic unit performs calculations on all of the plurality of source pixel arrays to generate the top-left-corner target pixel of the first target block, the other target pixels of the first target block are generated.

12. The graphics processing device as claimed in claim 11, wherein:
the arithmetic logic unit accumulates all of the plurality of source pixel arrays with weighting factors to generate the first target block.

13. A method for graphics processing, comprising:
providing a buffer within a graphics processing device to buffer a plurality of source blocks, wherein the plurality of source blocks are directly read from a system memory;
providing an indicator register including at least one instruction pointer within the graphics processing device; and
using the instruction pointer to read all source pixels in a first source block of the plurality of source blocks and adjacent source pixels in at least an adjacent source block with respect to the first source block from the buffer, to generate a first target block that includes a plurality of target pixels.

14. The method for graphics processing as claimed in claim 13, wherein:
the buffer buffers a source pixel group of an image read from the system memory, wherein the source pixel group includes the plurality of source blocks, and the buffer includes a plurality of vector registers, and each of the plurality of source blocks is buffered in corresponding one of the plurality of vector registers.

15. The method for graphics processing as claimed in claim 13, wherein:
the first target block and each of the plurality of source blocks contain n×m pixels including n rows of pixels in m columns wherein n and m are integers greater than 1.

16. The method for graphics processing as claimed in claim 13, wherein:
to generate the first target block, a linear calculation is performed on all required source pixels read from the buffer by using the instruction pointer, wherein all required source pixels include all source pixels in the first source block and the adjacent source pixels.

17. The method for graphics processing as claimed in claim 16, wherein:
the linear calculation is filtering by using a p×q window filter, wherein an input of the p×q window filter includes a p×q pixel array including p rows of source pixels within q columns, an output of the p×q window filter includes a target pixel corresponding to the first target block, wherein p and q are integers greater than 1.

18. The method for graphics processing as claimed in claim 17, wherein:
a step range of the instruction pointer is set based on a height p or a width q of the p×q window filter.

19. The method for graphics processing as claimed in claim 17, wherein:
the filtering is mean filtering, wherein mean filtering is performed by setting same weights to each of source pixels in p×q pixel array to get the target pixel.

20. The method for graphics processing as claimed in claim 17, wherein:
the filtering includes generation of a top-left-corner target pixel of the first target block based on an n×m pixel array including n rows of source pixels within m columns, wherein the top-left-corner target pixel of the first target block is regarded as a top-left-corner pixel in the n×m pixel array.

21. The method for graphics processing as claimed in claim 13, wherein:
after generating the first target block, the instruction pointer is operated to read source pixels in a second source block and adjacent source pixels in at least an adjacent source block with respect to the second source block from the buffer, for generating a second target block, wherein pixels of the first source block in a vector register have been updated by pixels of a new source block read from the system memory.

22. The method for graphics processing as claimed in claim 13, wherein:
a plurality of pixels in the buffer have been updated by a plurality of pixels in a new source block read from the system memory after the first target block is generated.

23. The method for graphics processing as claimed in claim 13, further comprising:
getting a plurality of source pixel arrays by moving a top-left-corner array pixel along all source pixels of a top-left-corner target pixel of the first target block,
wherein, when performing calculations on all of the plurality of source pixel arrays to generate the top-left-corner target pixel of the first target block, the other target pixels of the first target block are generated.

24. The method for graphics processing as claimed in claim 23, wherein:
all of the plurality of source pixel arrays are accumulated with weighting factors to generate the first target block.

* * * * *